(12) United States Patent
Sawatzki et al.

(10) Patent No.: US 11,005,145 B2
(45) Date of Patent: May 11, 2021

(54) PRELOADED BATTERY MODULE SAFETY PLUGS

(71) Applicant: Ford Global Technologies, LLC, Dearborn, MI (US)

(72) Inventors: Marius Sawatzki, Pulheim (DE); Daniel Meckenstock, Wuppertal (DE); Joergen Hilmann, Leverkusen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 16/375,953

(22) Filed: Apr. 5, 2019

(65) Prior Publication Data

US 2019/0319248 A1    Oct. 17, 2019

(30) Foreign Application Priority Data

Apr. 13, 2018 (DE) .......................... 102018205629.3

(51) Int. Cl.
*H01M 50/502* (2021.01)
*H01R 13/642* (2006.01)
*H01R 13/631* (2006.01)
*B60L 50/64* (2019.01)
*H01M 50/572* (2021.01)
(Continued)

(52) U.S. Cl.
CPC .......... *H01M 50/502* (2021.01); *B60L 50/64* (2019.02); *H01M 50/543* (2021.01); *H01M 50/572* (2021.01); *H01R 13/631* (2013.01); *H01R 13/635* (2013.01); *H01R 13/642* (2013.01); *B60K 6/28* (2013.01); *B60Y 2200/91* (2013.01); *B60Y 2200/92* (2013.01); *B60Y 2400/112* (2013.01); *H01M 50/579* (2021.01); *H01M 2200/00* (2013.01); *H01M 2220/20* (2013.01)

(58) Field of Classification Search
None
See application file for complete search history.

(56) References Cited

U.S. PATENT DOCUMENTS 9,260,027 B2    2/2016  Kim
2010/0261045 A1  10/2010  Wu et al.
(Continued)

FOREIGN PATENT DOCUMENTS

DE    102013200930 A1    7/2014
DE    102013017249 A1    4/2015

*Primary Examiner* — Jonathan Crepeau
(74) *Attorney, Agent, or Firm* — David B. Kelley; Carlson, Gaskey & Olds, P.C.

(57) ABSTRACT

This disclosure relates to safety plugs for a battery of an electrified vehicle. An example battery includes a first battery module adjacent a second battery module, with each battery module having a respective housing. Further, the first battery module includes a first electrical contact and the second battery module includes a second electrical contact configured to electrically connect to the first electrical contact in a normal operating condition. The first and second electrical contacts are biased away from one another in a first direction, and the first and second electrical contacts are held together by a positive locking arrangement in the normal operating condition. Additionally, the first and second electrical contacts are configured to move out of contact with one another upon relative movement of the first and second battery modules in a second direction transverse to the first direction.

20 Claims, 8 Drawing Sheets

(51) Int. Cl.
  *H01R 13/635* (2006.01)
  *H01M 50/543* (2021.01)
  *B60K 6/28* (2007.10)
  *H01M 50/579* (2021.01)

(56) References Cited

U.S. PATENT DOCUMENTS

| | | | |
|---|---|---|---|
| 2015/0171410 A1* | 6/2015 | Shin | H01M 50/578 |
| | | | 429/61 |
| 2016/0372733 A1* | 12/2016 | Benedict | H01M 50/502 |
| 2017/0098814 A1 | 4/2017 | Golubkov | |
| 2018/0337384 A1* | 11/2018 | Volinski | H01M 50/147 |
| 2020/0099024 A1* | 3/2020 | Ryu | H01M 50/531 |
| 2020/0144587 A1* | 5/2020 | Kim | H01M 50/578 |

* cited by examiner

PRELOADED BATTERY MODULE SAFETY PLUGS

RELATED APPLICATION(S)

This application claims priority to German Patent Application No. 102018205629.3, filed on Apr. 13, 2018, the entirety of which is herein incorporated by reference.

TECHNICAL FIELD

This disclosure relates to safety plugs for a battery of an electrified vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction battery is a relatively high-voltage battery that selectively powers the electric machines, and potentially other electrical loads of the electrified vehicle.

The traction battery can include battery modules, each having a housing containing a plurality of interconnected battery cells that store energy. Traction batteries must satisfy various safety requirements so that, in the event of an accident with a mechanical load effect on the battery accompanied by an at least partial destruction and/or deformation of the battery, electrical contact between battery modules and other electrically conductive components of the motor vehicle is prevented as reliably as possible.

As one example, DE 10 2013 017 249 A1 discloses a plug connector arrangement for the electrical coupling of battery modules, each of which have a battery module housing. At least two plug connectors are arranged at corners and/or edges of each battery module housing. In the case of adjacently arranged battery module housings, two plug connectors belonging to different battery modules are aligned parallel next to one another and can be electrically connected to one another by a connecting plug which can be attached to both plug connectors.

As another example, US 2017/0098814 A1 discloses a busbar for the electrical connection of a plurality of cells of a battery module. To electrically disconnect the battery cells from one another in the event of a thermal runaway of at least one of the cells or in the event of a short circuit, the busbar has a core and a shell which is produced at least partially from a first material, which is an electrically conducting material. The core is produced at least partially from a second material, which has a thermal expansion coefficient which is significantly greater than the thermal expansion coefficient of the first material. Under the action of heat, the core therefore expands at a considerably greater rate than the shell, thereby leading to cracks in the shell at specified crack points of the shell so that the electrical connection between two battery cells which is produced via the intact shell is interrupted.

DE 10 2013 200 930 A1 discloses a device for the mechanical coupling of at least two mutually adjacently arranged accumulator modules of a modularly constructed accumulator. The device has at least one first connecting means arranged on one accumulator module and at least one further connecting means arranged on at least one further accumulator module. The connecting means are designed and arranged on the accumulator modules in such a way that the first connecting means engages with positive locking in the further connecting means when the accumulator modules are arranged correctly.

U.S. 2010/0261045 A1 discloses a battery connector arrangement having a stress relief component, which weakens a force acting on the stress relief component in order to reduce its effect on the connector arrangement. Owing to the weakening of the force, the connector arrangement maintains a substantially fixed position relative to a battery pack component and reduces the potential for interruption of the electrical connection.

U.S. Pat. No. 9,260,027 discloses a device for attaching and detaching a connector for an electric vehicle with a replaceable battery. The device automatically connects and disconnects a connector to a battery and a connector to a vehicle when a battery is replaced. The device can have a connector housing, which is arranged on a battery assembly module for assembling and disconnecting the battery, and a connecting element, which is connected to a cable on the vehicle, is movably arranged within the connector housing and is selectively connected to the connector on the battery. A movable element is arranged in the connector housing such that it is movable in line with the connecting element by a guide pin of the connector on the battery, and an energy transmission element is connected to the connecting element and the movable element, and moves the connecting element contrary to the movement direction of the movable element.

SUMMARY

A battery for an electrified vehicle according to an exemplary aspect of the present disclosure includes, among other things, a first battery module adjacent a second battery module, each battery module having a respective housing. Further, the first battery module includes a first electrical contact and the second battery module includes a second electrical contact configured to electrically connect to the first electrical contact in a normal operating condition. The first and second electrical contacts are biased away from one another in a first direction, and the first and second electrical contacts are held together by a positive locking arrangement in the normal operating condition. Additionally, the first and second electrical contacts are configured to move out of contact with one another upon relative movement of the first and second battery modules in a second direction transverse to the first direction.

In a further non-limiting embodiment of the foregoing battery, the first and second electrical contacts are movable between a contact position outside the respective housing and a protective position entirely within the respective housing.

In a further non-limiting embodiment of any of the foregoing batteries, the first and second electrical contacts are in the contact position when in the normal operating condition.

In a further non-limiting embodiment of any of the foregoing batteries, the first and second electrical contacts are biased away from one another and toward the protective position by respective prestressing elements.

In a further non-limiting embodiment of any of the foregoing batteries, the prestressing elements are springs.

In a further non-limiting embodiment of any of the foregoing batteries, the first and second contact elements are arranged substantially in an L shape, and are configured to pivot via a swivel joint arranged within a respective housing.

In a further non-limiting embodiment of any of the foregoing batteries, each of the respective housings includes a seal configured to seal a through hole in the respective housing, and the first and second contact elements project partially through the seal and outside the housing in the normal operating condition.

In a further non-limiting embodiment of any of the foregoing batteries, the seals are each provided by an elastomeric membrane with a slit.

In a further non-limiting embodiment of any of the foregoing batteries, the first and second contact elements are provided by pistons configured translate in the first direction.

In a further non-limiting embodiment of any of the foregoing batteries, each of the first and second battery modules provides a guide cylinder, and the first and second contact elements are configured to move within a respective guide cylinder.

In a further non-limiting embodiment of any of the foregoing batteries, a prestressing element is arranged in each of the guide cylinders, and the prestressing elements are configured to bias the respective pistons away from one another.

In a further non-limiting embodiment of any of the foregoing batteries, each guide cylinder is produced at least partially from electrically insulating material.

In a further non-limiting embodiment of any of the foregoing batteries, contact surfaces of the first and second contact elements are produced from electrically conductive material.

In a further non-limiting embodiment of any of the foregoing batteries, the contact surfaces are produced from soft metallic coating.

In a further non-limiting embodiment of any of the foregoing batteries, the positive locking arrangement includes a projection and a slot providing a dovetail joint.

A method according to an exemplary aspect of the present disclosure includes, among other things, holding first and second electrical contacts of respective first and second battery modules in a positive locking arrangement in a normal operating condition, biasing the first and second electrical away from one another in a first direction, and moving the first and second electrical contacts out of contact with one upon relative movement of the first and second battery modules in a second direction transverse to the first direction.

In a further non-limiting embodiment of the foregoing method, the moving step includes moving the first and second electrical contacts to a protective position entirely within a housing of a respective one of the first and second battery modules.

In a further non-limiting embodiment of any of the foregoing methods, the first and second electrical contacts are biased away from one another and toward the protective position by respective prestressing elements.

In a further non-limiting embodiment of any of the foregoing methods, the positive locking arrangement includes a projection and a slot providing a dovetail joint.

In a further non-limiting embodiment of any of the foregoing methods, contact surfaces of the first and second contact elements are produced from electrically conductive material, and, during the holding step, an electrical connection is formed between the first and second contact elements.

DETAILED DESCRIPTION

This disclosure relates to safety plugs for a battery of an electrified vehicle. An example battery includes a first battery module adjacent a second battery module, with each battery module having a respective housing. Further, the first battery module includes a first electrical contact and the second battery module includes a second electrical contact configured to electrically connect to the first electrical contact in a normal operating condition. The first and second electrical contacts are biased away from one another in a first direction, and the first and second electrical contacts are held together by a positive locking arrangement in the normal operating condition. Additionally, the first and second electrical contacts are configured to move out of contact with one another upon relative movement of the first and second battery modules in a second direction transverse to the first direction. In this way, in response to a collision, for example, the first and second electrical contacts no longer contact one another, which increases safety. These and other benefits will be appreciated from the below description.

This disclosure prevents an electrical connection between battery modules of a high voltage battery and other electrically conductive components of the motor vehicle in the event of an accident with a mechanical load effect on a high voltage battery of a motor vehicle.

It should be pointed out that, in the description below, individually described features and measures can be combined with one another in any technically useful manner and demonstrate further embodiments of this disclosure. The description additionally characterizes and specifies this disclosure in particular in conjunction with the figures.

According to this disclosure, the electrical contact elements of mutually adjacently arranged battery modules of the high voltage battery are connected to one another with positive locking in a normal state of the high voltage battery so that the battery modules are electrically connected to one another via the contact elements. In this case, a normal state of the high voltage battery refers to a state of the high voltage battery in which no mechanical loads, or only those generated by a collision-free driving operation of the motor vehicle, act on the high voltage battery. On the other hand, a collision state of the high voltage battery refers to a state of the high voltage battery in which, in the event of an accident involving the motor vehicle, collision-induced, and thus considerably greater, mechanical loads act on the high voltage battery and can lead to an at least partial destruction of, and/or change in, the shape of the high voltage battery.

If such a collision state is present, this can result in a displacement or movement of the battery modules of the high voltage battery, and therefore the contact elements, relative to one another. Since, according to this disclosure, the contact elements are designed in such a way that the positive locking produced between the contact elements located in the contact positions can be released by such a movement of the contact elements relative to one another in a movement direction, which extends transversely to the prestressing direction in which the respective contact element is prestressed by way of the respective prestressing element, the positive locking between the contact elements can be released in the collision state of the high voltage battery so that the electrical connection between the battery modules displaced relative to one another is broken.

According to this disclosure, this electrical disconnection of the battery modules is brought by the contact elements being released from one another. In particular, each contact element is moved from a contact position into a protective position by way of the respective prestressing elements, and are therefore each arranged completely within the module housing of the respective battery module so that they cannot come into contact with another component of the high voltage battery and the motor vehicle. Thus, this disclosure prevents a high voltage short circuit from being generated or a heavy current from flowing through an electrically conductive component of the motor vehicle.

When assembling a high voltage battery according to this disclosure, the individual battery modules can be electrically connected to one another in a simple manner without thereby requiring the actuation of, for example, a screw connection or the like to fasten electrical connecting elements to one another. The contact elements of adjacent battery modules, which are to be connected to one another with positive locking, simply have to be clasped and connected to one another with positive locking, preferably by way of an electrically insulating tool, which takes place via a movement of the contact elements relative to one another in the movement direction which extends transversely to the prestressing direction in which the respective contact element is prestressed by way of the respective prestressing element.

Each contact element can be produced partially or completely from an electrically conducting material. At least one contact element can have an electrically insulating sheath so that the respective contact element can be handled manually without thereby putting a person connecting contact elements to one another with positive locking at risk of receiving an electric shock. At least one contact element can be linearly movably or pivotably arranged on the respective battery module.

At least one prestressing element can be connected indirectly or directly to the module housing of the respective battery module. Each prestressing element exerts either a pressure force or a tensile force on the respective contact element to prestress the electrical contact elements in the direction of its protective position. At least one prestressing element can be produced partially or completely from a metallic material. At least one prestressing element can be electrically insulated with respect to the contact element respectively connected thereto and/or with respect to a further component of the respective battery module.

The through hole in the module housing of the respective battery module can have a shape adapted to the form of a cross-sectional area of a portion of the respective contact element which is guided through the through hole and can be designed to be a predetermined amount greater than the cross-sectional area of the portion of the contact element.

The module housing of the respective battery module can be produced partially or completely from a metallic material, a plastics material, or a composite material and is preferably designed to be dimensionally stable. Each battery module can also have more than two battery cells arranged in the module housing, which can be lithium-ion battery cells, for example. Oppositely poled electrical connections of adjacent battery modules can be electrically connected to one another via the contact elements.

The positive locking between contact elements can be produced by forming at least one projection with an undercut on the one contact element and configuring a portion of the other contact element complementary thereto. The projection can have, for example, an at least partially rounded, for example circular or elliptical, and/or at least partially polygonal cross-sectional area, which is perpendicular to the movement direction, which extends transversely to the prestressing direction in which the respective contact element is prestressed by way of the respective prestressing element. For example, a dovetail connection (i.e., a dovetail joint) can be formed between the contact elements to connect the contact elements to one another with positive locking.

The high voltage battery can be, in particular, a traction battery of an electrified vehicle, in particular an electric vehicle or a hybrid electric vehicle. The high voltage battery can also have more than two battery modules, which are electrically connected to one another according to this disclosure in pairs.

According to an embodiment, each contact element is designed in an L shape and has two mutually connected limbs, wherein a first limb is connected to the respective battery module by its end portion which is remote from a second limb via at least one swivel joint and the second limb is connected to the first limb in such a way that, upon a pivoting of the contact element in the direction of its contact position, the second limb moves in front of the first limb and is guided through the through hole in the module housing of the respective battery module. In accordance with this, the respective contact element is arranged on the respective battery module such that it is pivotable within a movement plane and can be pivoted back and forth between the protective position and the contact position by pivoting about a pivot axis defined by the swivel joint. When the contact element is located in its contact position, only a portion of the second limb of the respective contact element projects out of the module housing of the respective battery module.

A further embodiment provides that at least one seal is arranged on each module housing for sealing the respective module housing in the region of the through hole formed therein. This prevents moisture or foreign bodies from penetrating into the module housing, for example. Moreover, vapors or the like, which can be produced within the module housing in the event of a thermal runaway of a battery cell, for example, can be prevented from escaping from the module housing. The seal is designed and arranged in such a way that, when the contact element is located in its contact position, the module housing is sealed with respect to the portion of the contact element which projects through the through hole in the module housing and, when the contact element is not guided through the through hole, it is moreover sealed with respect to the environment. The seal can be arranged on the module housing such that it extends at least partially around the through hole.

According to a further embodiment, the seal is membrane-like and is produced from an elastomer, and either has at least one separating slit which can be widened by contact with the second limb of the respective contact element or is fastened circumferentially on the second limb. In the first alternative, owing to the elastic properties of the seal, the separating slit is closed when the seal is not in contact with the contact element. If the contact element is moved from its protective position into its contact position, it comes into contact with the seal, in particular in the region of the separating slit, whereby the seal is elastically deformed so that the separating slit opens and the seal nestles circumferentially around the second limb of the contact element which is guided through the through hole in the module housing. The module housing is thus sealed with respect to the contact element. In the second alternative according to the embodiment, the seal is fixedly connected to the second limb of the contact element in each state of the contact element and is elastically deformed during the movement of the contact element. The module housing is thus sealed with respect to the contact element in each state of the contact element.

According to a further embodiment, each contact element has a cylindrical contact portion, which can be guided through the through hole in the module housing of the respective battery module, and a piston portion arranged circumferentially on the contact portion. Further, each battery module has a guide cylinder, which is arranged within its module housing and in which the piston portion of the respective contact element is axially displaceably guided between two maximum positions. Each contact element has an electrical connecting portion which is arranged on a side of its piston portion, and which is remote from the through hole in the module housing of the respective battery module. The electrical connecting portion is also arranged flush with the contact portion and is guided through a guide opening in a cylinder base of the respective guide cylinder. The cylinder base is remote from the through hole. Upon a linear movement of the respective contact element from the protective position into the contact position, and vice versa, the contact element is guided by way of the respective guide cylinder. A longitudinal center axis of the respective guide cylinder is arranged flush with the through hole in the module housing of the respective battery module. The respective guide cylinder has, on its side facing the through hole, an opening through which the contact portion of the respective contact element can be moved in the direction of the through hole and through this latter. The respective through hole can be configured in such a way that it can be used to guide the respective contact portion. The respective guide cylinder and the piston portion of the respective contact element can have polygonal cross-sectional areas to prevent a twisting of the contact portion about its longitudinal center axis relative to the guide cylinder. The twist-prevention can also be realized in another manner, for example by a rib, which is arranged on an inner lateral surface of the respective guide cylinder and extends in the axial direction, and an axial groove which is formed on an outer lateral surface of the respective piston portion and in which the rib engages. Alternatively, the rib can be formed on the outer lateral surface of the respective piston portion and the groove can be formed on the inner lateral surface of the respective guide cylinder. The connecting portion of the respective contact element establishes the electrical connection of the contact element to the battery cells present in the respective module housing. A height of the respective guide cylinder is smaller than an axial length of the respective contact element. The respective guide cylinder seals the respective module housing with respect to the respective contact element.

A further embodiment provides that the prestressing element of the respective battery module is arranged within the guide cylinder of this battery module. The respective prestressing element is thus protected and arranged in an accurate position within the respective battery module.

According to a further embodiment, at least one delimiting element is arranged on a side of the piston portion of the contact element of the respective battery module which faces the through hole in the module housing of this battery module. The delimiting element protrudes axially from the piston portion in such a way that, when the contact element is located in its contact position, the delimiting element is supported against a portion of the guide cylinder, the module housing, or another component of the battery module. This supporting state defines a maximum position of the piston portion of the respective contact element within the respective guide cylinder. The respective delimiting element can be designed, for example, as a pin or as a ring arranged such that it extends partially or completely around the contact portion of the respective contact element at a spacing. For example, the respective delimiting element can be formed by a piston skirt on the piston portion of the respective contact element.

According to a further embodiment, each guide cylinder is produced at least partially from an electrically insulating material. It can thus be substantially prevented that the respective contact element comes into electrical contact with other components of the respective battery module which are arranged in the module housing, even if the module housing and/or the respective guide cylinder is/are deformed when an accident-induced force acts on the high voltage battery.

A further embodiment provides that contact surfaces of the contact elements which contact one another when the contact elements are connected to one another with positive locking are provided at least partially with a soft metallic coating. The soft metallic coating can be produced from copper, for example. By using the soft metallic coating for the mutual contacting of the contact elements, it is possible to prevent a material bonding of the contact elements resulting from a heating of the contact elements, which can be generated by a relatively strong current flowing through the contact elements during operation of the high voltage battery, in order to ensure the feasibility of the present disclosure. The contact surfaces of the contact elements can also each be provided completely with the soft metallic coating.

According to a further embodiment, the at least one prestressing element is designed as a pressure spring or tension spring. The respective prestressing element designed as a pressure spring can be clamped, for example, between the first limb of a respective contact element designed in an L shape and the respective module housing. Alternatively, the respective prestressing element designed as a pressure spring can be clamped between the piston portion of the respective contact element and the respective module housing. The respective prestressing element can be designed as a spiral spring here and be arranged circumferentially on the contact portion of the respective contact element.

Now specifically turning to the drawings, it should be understood that in the various figures, identical parts are provided with the same reference signs and are therefore generally also only described once.

Figure 1:
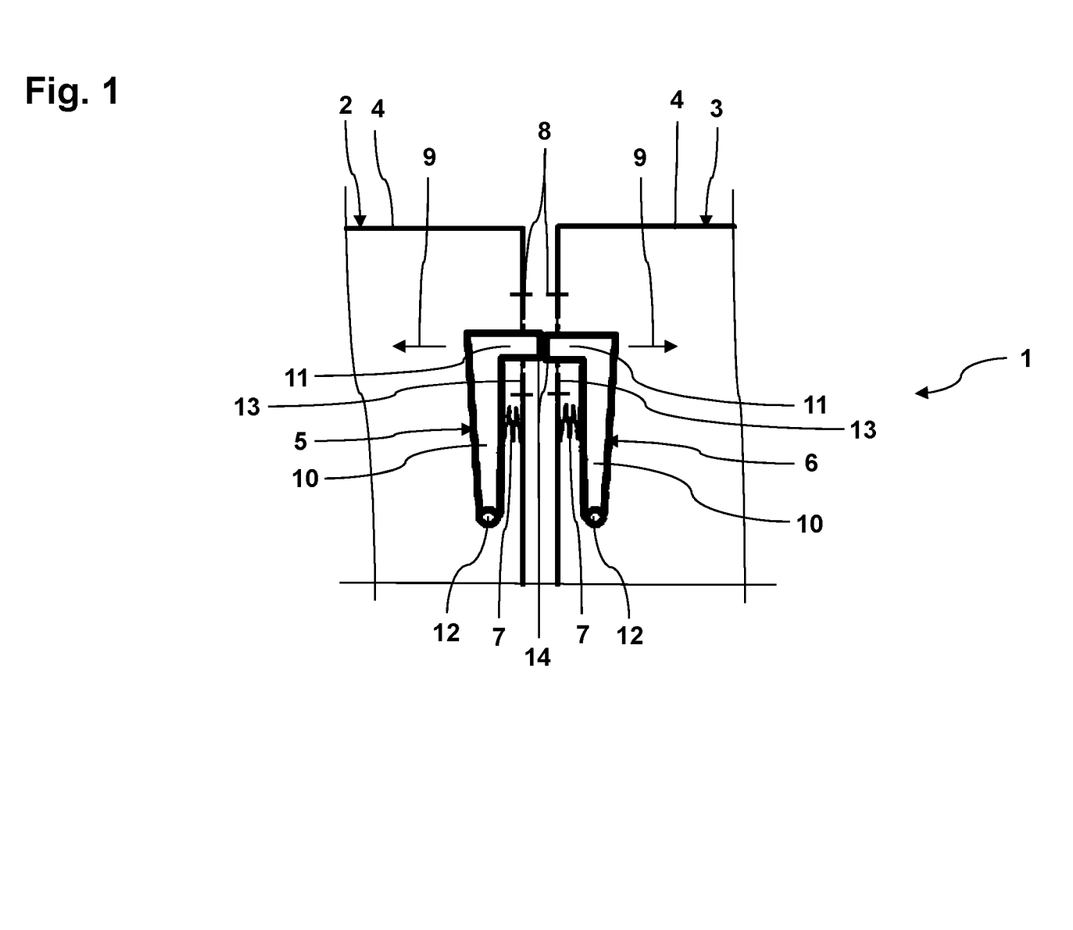
FIG. 1 is a schematic illustration of an exemplary embodiment for a high voltage battery according to this disclosure in a normal state (i.e., a normal operating condition).

FIG. 1 is a schematic illustration of an exemplary embodiment for a high voltage battery 1 for a motor vehicle (not shown) in a normal state (i.e., a normal operating condition). The high voltage battery 1 has two mutually adjacently arranged battery modules 2 and 3, which each have a module housing 4 for receiving battery cells (not shown) and each have at least one electrical contact element 5, 6 for electrical connecting the battery modules 2 and 3. The term electrical contact element is meant to refer to a structural element that is also an electrical component configured to pass electrical current therethrough and at least partially made of electrically conductive material. The electrical contact elements 5, 6 will be described in more detail below. The electrical contact elements are also referred to generally as plugs herein.

Each battery module 2 or 3 has a prestressing element 7, which is arranged within the module housing 4 of the respective battery module 2, 3, and is connected to the contact element 5, 6 of a respective battery module 2, 3. In one example, the prestressing element 7 is a spring, such as a coil or helical spring. This disclosure is not limited to springs and extends to other types of prestressing elements which are configured to bias the contact elements 5, 6 as described herein.

Each contact element 5, 6 is arranged on the respective battery module 2, 3 such that it is movable between a contact position (shown in FIG. 1), in which the respective contact element 5, 6 is guided through a through hole 8 in the respective module housing 4 and is arranged at least partially outside this module housing 4, and a protective position (shown in FIG. 2), in which the respective contact element 5, 6 is arranged completely within the respective module housing 4. The prestressing element 7 is configured to bias the contact elements 5, 6 away from one another in a prestressing direction 9.

Figure 2:
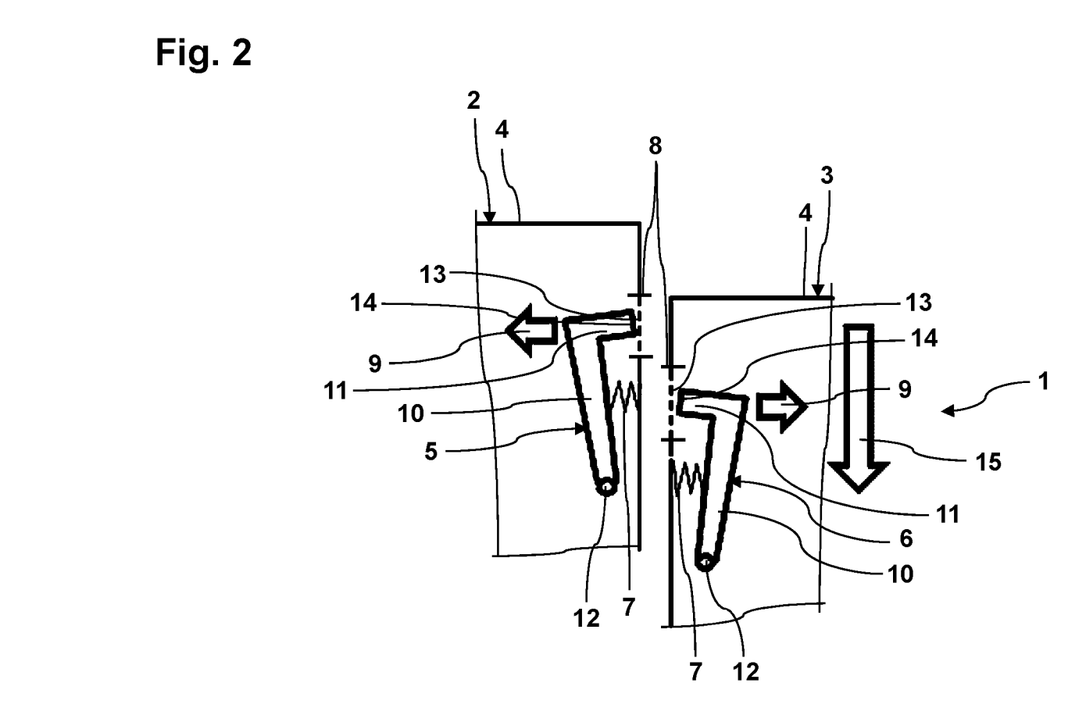
FIG. 2 is a schematic illustration of the high voltage battery shown in FIG. 1 in a collision state.

The contact elements 5, 6 are designed in such a way that positive locking (shown in FIG. 1) can be produced between the contact elements 5, 6 located in the contact positions. The positive locking can be released by a movement of the contact elements 5, 6 relative to one another in a movement direction (i.e., 15; FIG. 2) which extends transversely to the prestressing direction 9. In a particular example, the movement direction 15 is substantially normal to the prestressing direction 9.

In this example, each contact element 5, 6 is designed in substantially an L-shape and has two mutually connected limbs 10 and 11. A first limb 10 is connected to the respective battery module 2 or 3 by its end portion which is remote from a second limb 11 via a swivel joint 12. The second limb 11 is connected to the first limb 10 in such a way that, upon a pivoting of the contact element 5, 6 in the direction of its contact position, the second limb 11 moves in front of the first limb 10 and is guided through the through hole 8 in the respective module housing 4. The respective prestressing element 7 is clamped between the respective first limb 10 and the respective module housing 4.

A seal 13 is arranged on each module housing 4 for sealing the respective module housing 4 in the region of the through hole 8 formed therein. Each seal 13 is produced, membrane-like, from an elastomer and has at least one separating slit (not shown) which can be widened by contact with the second limb 11 of the respective contact element 5 or 6.

Contact surfaces of the contact elements 5 and 6, which contact one another (as shown in FIG. 1) when the contact elements 5 and 6 are connected, are provided at least partially with a soft metallic coating 14.

FIG. 2 is a schematic illustration of the high voltage battery 1 shown in FIG. 1 in a collision state, for example. As a result of a collision of the motor vehicle, the battery module 3 has been displaced according to the arrow 15 relative to the battery module 2. The contact elements 5 and 6 here have been moved relative to one another in the movement direction 15 which extends transversely to the prestressing direction 9. The positive locking between the contact elements 5 and 6 has thus been released. Following the release of the positive locking between the contact elements 5, 6, the contact elements 5, 6 have been pivoted by the prestressing elements 7 into the protective positions shown, so that the contact elements 5 and 6 are arranged completely within the respective module housing 4.

Figure 3:
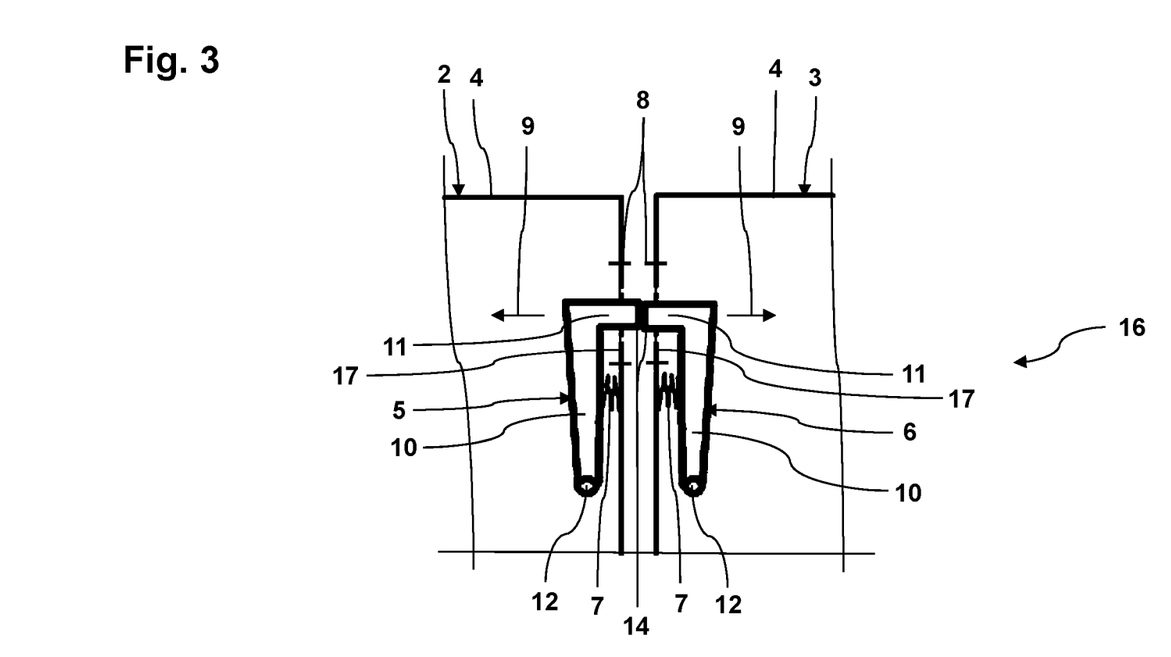
FIG. 3 is a schematic illustration of a further exemplary embodiment for a high voltage battery according to this disclosure in a normal state.

FIG. 3 is a schematic illustration of a further exemplary embodiment for a high voltage battery 16 for a motor vehicle (not shown) in a normal state. The high voltage battery 16 differs from the exemplary embodiment shown in FIGS. 1 and 2 in that the respective seal 17 is fastened circumferentially on the second limb 11 of the respective contact element 5, 6 and is moved therewith.

Figure 4:
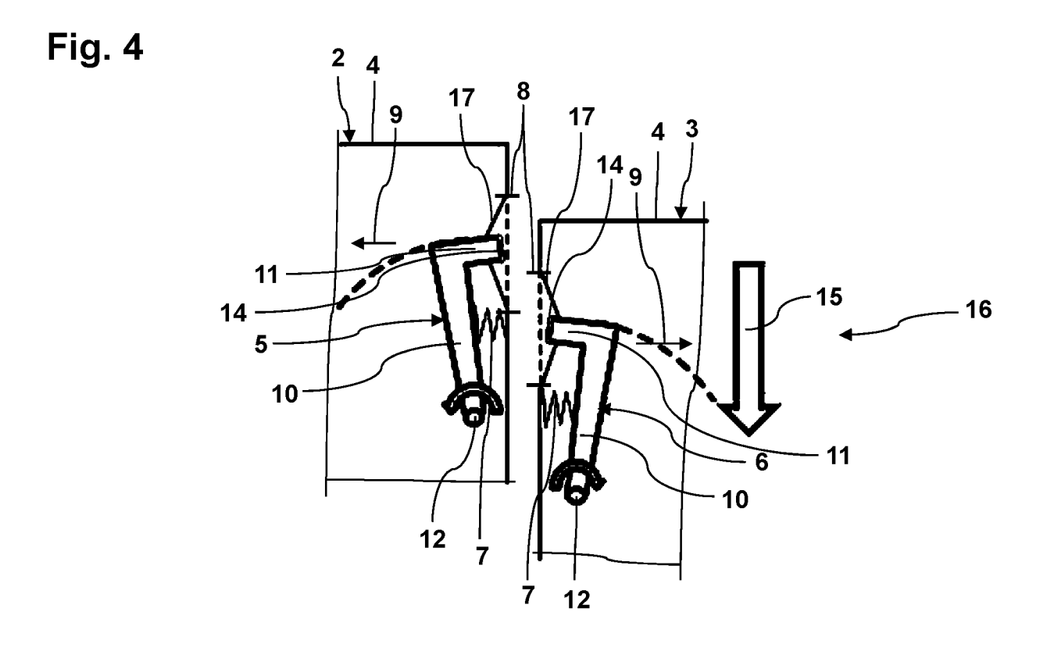
FIG. 4 is a schematic illustration of the high voltage battery shown in FIG. 3 in a collision state.

FIG. 4 is a schematic illustration of the high voltage battery 16 shown in FIG. 3 in a collision state, and is similar to FIG. 2. In this state, the seals 17 are elastically deformed by movement of the respective contact elements 5, 6.

Figure 5:
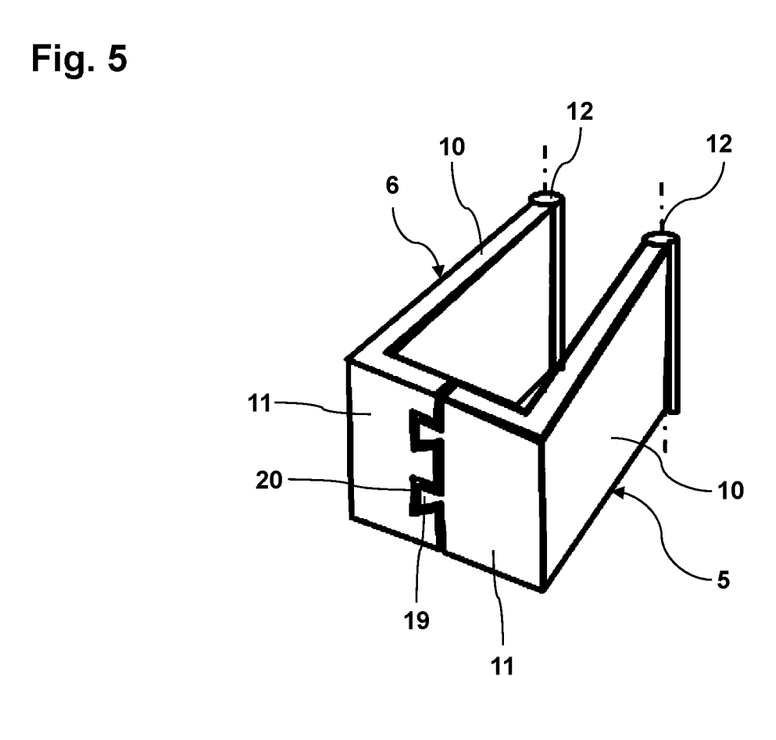
FIG. 5 is a schematic and perspective illustration of contact elements of a further exemplary embodiment for a high voltage battery according to this disclosure.

FIG. 5 is a schematic and perspective illustration of contact elements 5, 6 of a further exemplary embodiment for a high voltage battery (not shown) for a motor vehicle (not shown). In FIG. 5, the contact elements 5, 6 are connected to one another with positive locking. The contact elements 5, 6 can be used for the exemplary embodiment shown in FIGS. 1 and 2 or the exemplary embodiment shown in FIGS. 3 and 4.

In particular, in FIG. 5, two projections 19 are arranged on the contact element 5 at the free end of the second limb 11 thereof. The projections 19 engage with positive locking in slots 20 at the free end of the second limb 11 of the contact element 6. The slots have a complementary design to the projections 19. Two dovetail connections (i.e., dovetail joints) are thus formed between the contact elements 5, 6. These positively locking connections can be released by a movement of the contact elements 5 and 6 transversely to the second limbs 11 (i.e., in direction 15), but are not meant to be released by relative movement of the contact elements 5, 6 away from one another (i.e., in direction 9).

Figure 6:
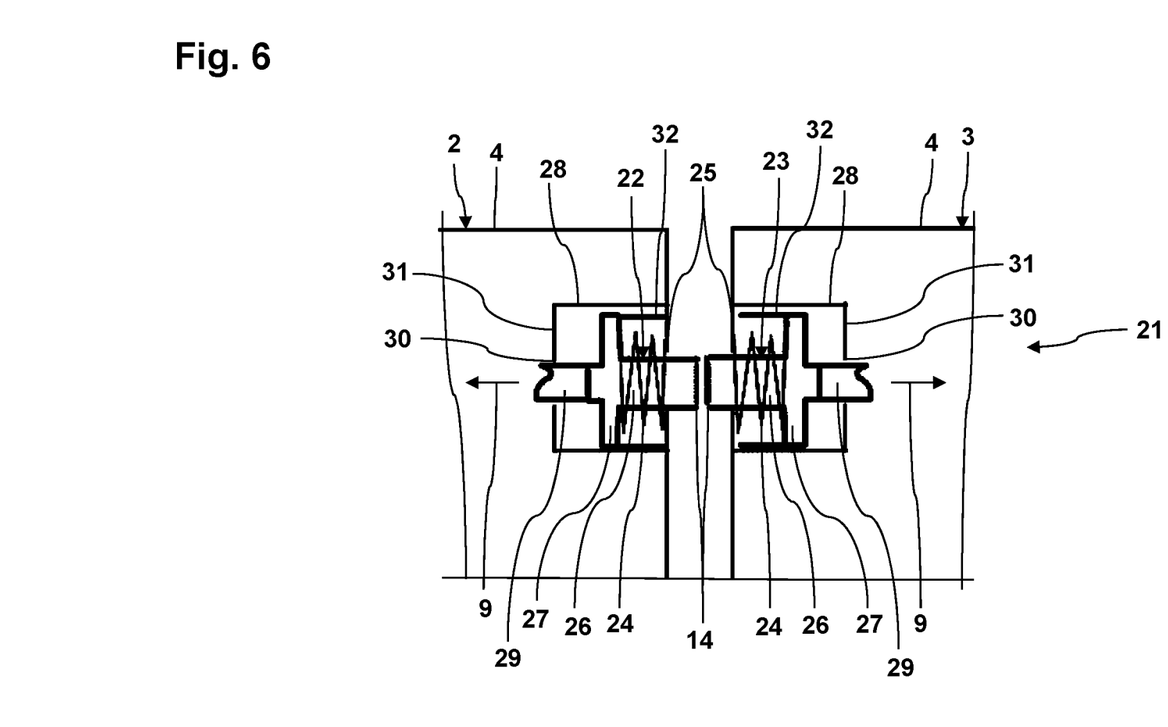
FIG. 6 is a schematic illustration of a further exemplary embodiment for a high voltage battery according to this disclosure in a normal state.

FIG. 6 is a schematic illustration of a further exemplary embodiment for a high voltage battery 21 for a motor vehicle (not shown) in a normal state. The high voltage battery 21 has two mutually adjacently arranged battery modules 2 and 3, which each have a module housing 4 for receiving battery cells (not shown) and each have at least one electrical contact element 22, 23 for electrically connecting the battery modules 2 and 3.

Each battery module 2, 3 has a prestressing element 24 which is arranged within the module housing 4 of the respective battery module 2, 3, and is connected to the contact element 22, 23 of the respective battery module 2, 3. The prestressing element 24 may be the same type of prestressing element as prestressing element 7.

Figure 7:
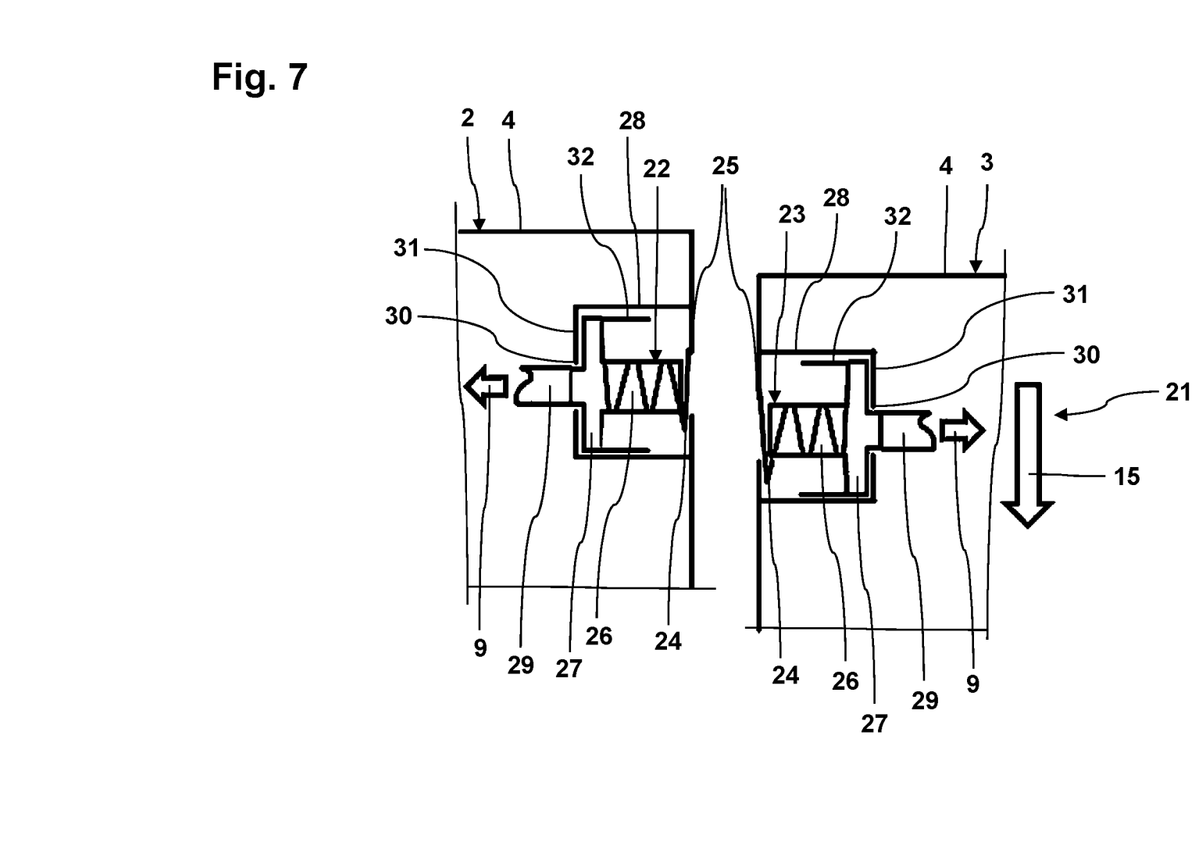
FIG. 7 is a schematic illustration of the high voltage battery shown in FIG. 6 in a collision state.

Each contact element 22, 23 is arranged on the respective battery module 2, 3 such that it is movable between a contact position (shown in FIG. 6), in which the respective contact element 22, 23 is guided through a through hole 25 in the module housing 4 of the respective battery module 2, 3, and is arranged at least partially outside this module housing 4, and a protective position (shown in FIG. 7), in which the respective contact element 22, 23 is arranged completely within the module housing 4 of the respective battery module 2, 3. The prestressing element 24 of the respective battery module 2, 3 prestresses the contact element 22, 23 of this battery module 2, 3 in the direction of the protective position. In other words, the prestressing elements 24 bias the contact elements 22, 23 away from one another in the prestressing direction 9 (FIG. 7).

The contact elements 22 and 23 are designed in such a way that positive locking (shown in FIG. 6) can be produced between the contact elements 22 and 23 located in the contact positions. The positive locking can be released by a movement of the contact elements 22, 23 relative to one another in a movement direction 15 (FIG. 7) which extends transversely to a prestressing direction 9 (FIG. 7).

Each contact element 22, 23 has a cylindrical contact portion 26, which can be guided through the through hole 25 in the module housing 4 of the respective battery module 2 or 3, and a piston portion 27 arranged circumferentially on the contact portion 26.

Each battery module 2, 3 has a guide cylinder 28, which is arranged within its module housing 4 and in which the piston portion 27 of the respective contact element 22, 23 is axially displaceably guided between two maximum positions. One maximum position is shown in FIG. 6. The prestressing element 24 of the respective battery module 2, 3 is arranged within the guide cylinder 28. Each guide cylinder 28 is produced at least partially from an electrically insulating material.

Each contact element 22, 23 has an electrical connecting portion 29. The electrical connecting portion 29 is arranged on a side of its piston portion 27 remote from the through hole 25 in the module housing 4 of the respective battery module 2, 3, is arranged flush with the contact portion 26, and is guided through a guide opening 30 in a cylinder base 31 of the respective guide cylinder 28. The cylinder base 31 is remote from the through hole 25.

An annular delimiting element 32 is arranged on a side of the piston portion 27 of the respective contact elements 22, 23 which faces the through hole 25 in the module housing 4 of the this module 2, 3. The delimiting element 32 protrudes axially from the piston portion 27 such that when the contact element 22, 23 is in its contact position, the delimiting element 32 is supported against a portion of the module housing 4. The respective delimiting element 32 is arranged at a radial spacing from the contact portion 26 of the respective contact element 22 or 23.

Contact surfaces of the contact elements 22 and 23, which, as shown in FIG. 6, contact one another when the contact elements 22 and 23 are connected to one another with positive locking. The contact surfaces of the contact elements 22, 23 are provided at least partially with a soft metallic coating 14.

FIG. 7 is a schematic illustration of the high voltage battery 21 shown in FIG. 6 in a collision state, similar to FIGS. 2 and 4. As a result of a collision of the motor vehicle, the battery module 3 has been displaced according to the arrow 15 relative to the battery module 2. The contact elements 22 and 23 have thus been moved relative to one another in the movement direction 15 which extends transversely to the prestressing direction 9. The positive locking between the contact elements 22 and 23 has thus been released. Following the release of the positive locking between the contact elements 22 and 23, the contact elements 22, 23 have been pivoted by the prestressing elements 24 into the protective positions, so that the contact elements 22 and 23 are arranged completely within the respective module housing 4.

Figure 8:
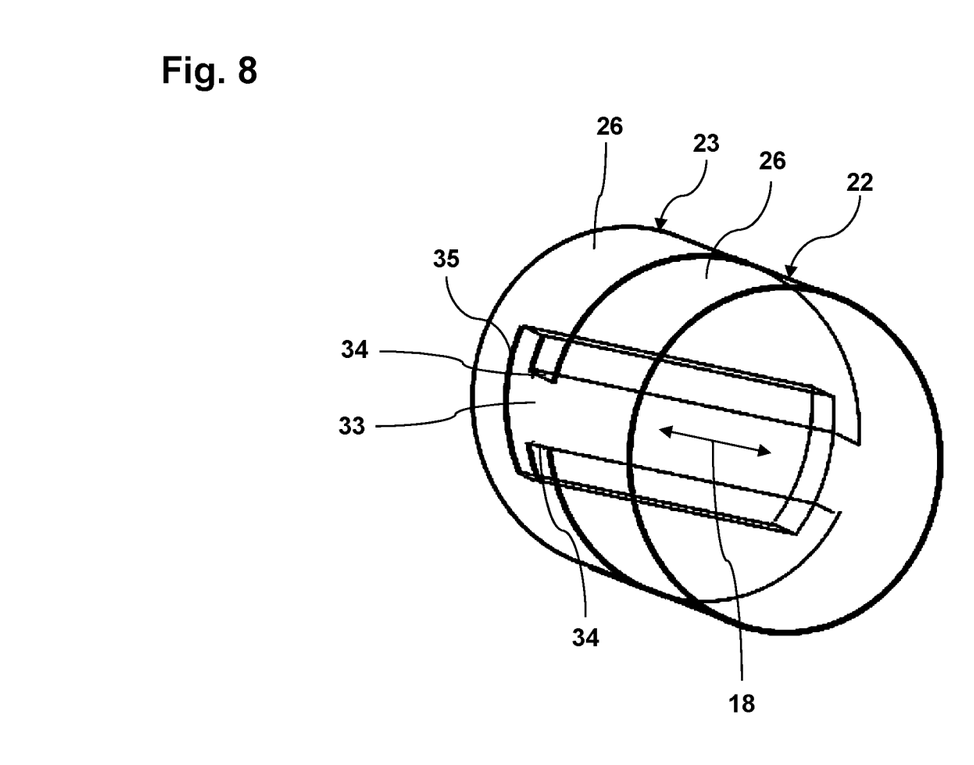
FIG. 8 is a schematic and perspective illustration of contact elements of a further exemplary embodiment for a high voltage battery according to this disclosure.

FIG. 8 is a schematic and perspective illustration of contact elements 22 and 23 of a further exemplary embodiment for a high voltage battery (not shown) for a motor vehicle (not shown). The contact elements are connected to one another with positive locking. The contact elements 22, 23 can be used for the exemplary embodiment shown in FIGS. 6 and 7.

In particular, in FIG. 8 a projection 33 with lateral undercuts 34 is arranged on the contact element 22 at the free end of the contact portion 26 thereof. The projection 33 engages with positive locking in a slot 35 at the free end of the contact portion 26 of the contact element 23. The slot 35 has a complementary design to the projection 33. A positive locking connection is thus formed between the contact elements 22 and 23. These positively locking connections can be released by a movement of the contact elements 22 and 23 in a movement direction indicated by a double-headed arrow 18, which is representative to movement in the direction 15 (FIG. 7).

Directional terms such as "fore," "aft," "transverse," "longitudinal," "vertical," "front," "rear," "side," etc., are used herein with reference to the normal operational attitude of a motor vehicle. It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A battery for an electrified vehicle, comprising:
a first battery module adjacent a second battery module, each battery module having a respective housing, wherein:
the first battery module includes a first electrical contact and the second battery module includes a second electrical contact configured to electrically connect to the first electrical contact in a normal operating condition,
the first and second electrical contacts are biased away from one another in a first direction,
the first and second electrical contacts are held together by a positive locking arrangement in the normal operating condition, and
the first and second electrical contacts are configured to move out of contact with one another upon relative movement of the first and second battery modules in a second direction transverse to the first direction.

2. The battery as recited in claim 1, wherein the first and second electrical contacts are movable between a contact position outside the respective housing and a protective position entirely within the respective housing.

3. The battery as recited in claim 1, wherein the first and second electrical contacts are in the contact position when in the normal operating condition.

4. The battery as recited in claim 2, wherein the first and second electrical contacts are biased away from one another and toward the protective position by respective prestressing elements.

5. The battery as recited in claim 4, wherein the prestressing elements are springs.

6. The battery as recited in claim 1, wherein the first and second contact elements are arranged substantially in an L shape, and are configured to pivot via a swivel joint arranged within a respective housing.

7. The battery as recited in claim 1, wherein:
each of the respective housings includes a seal configured to seal a through hole in the respective housing, and
the first and second contact elements project partially through the seal and outside the housing in the normal operating condition.

8. The battery as recited in claim 7, wherein the seals are each provided by an elastomeric membrane with a slit.

9. The battery as recited in claim 1, wherein the first and second contact elements are provided by pistons configured to translate in the first direction.

10. The battery as recited in claim 9, wherein:
each of the first and second battery modules provides a guide cylinder, and
the first and second contact elements are configured to move within a respective guide cylinder.

11. The battery as recited in claim 10, wherein:
a prestressing element is arranged in each of the guide cylinders, and
the prestressing elements are configured to bias the respective pistons away from one another.

12. The battery as recited in claim 10, wherein each guide cylinder is produced at least partially from electrically insulating material.

13. The battery as recited in claim 1, wherein contact surfaces of the first and second contact elements are produced from electrically conductive material.

14. The battery as recited in claim 13, wherein the contact surfaces are produced from soft metallic coating.

15. The battery as recited in claim 1, wherein the positive locking arrangement includes a projection and a slot providing a dovetail joint.

16. A method, comprising:
holding first and second electrical contacts of respective first and second battery modules in a positive locking arrangement in a normal operating condition;
biasing the first and second electrical contacts away from one another in a first direction; and
moving the first and second electrical contacts out of contact with one another upon relative movement of the first and second battery modules in a second direction transverse to the first direction.

17. The method as recited in claim 16, wherein the moving step includes moving the first and second electrical contacts to a protective position entirely within a housing of a respective one of the first and second battery modules.

18. The method as recited in claim 17, wherein the first and second electrical contacts are biased away from one another and toward the protective position by respective prestressing elements.

19. The method as recited in claim 16, wherein the positive locking arrangement includes a projection and a slot providing a dovetail joint.

20. The method as recited in claim 16, wherein:
contact surfaces of the first and second contact elements are produced from electrically conductive material, and
during the holding step, an electrical connection is formed between the first and second contact elements.

* * * * *